July 19, 1932. A. EHLENBECK 1,868,279

CUSHION OR INSERT FOR MATTRESSES OR THE LIKE CONSISTING OF SPIRAL SPRINGS

Filed Sept. 3, 1931

INVENTOR
Alfred Ehlenbeck
BY
Marshall & Hawley
ATTORNEYS

Patented July 19, 1932

1,868,279

UNITED STATES PATENT OFFICE

ALFRED EHLENBECK, OF WUPPERTAL-VOHWINKEL, GERMANY

CUSHION OR INSERT FOR MATTRESSES OR THE LIKE CONSISTING OF SPIRAL SPRINGS

Application filed September 3, 1931. Serial No. 560,914.

This invention relates to a cushion or insert for mattresses or the like consisting of spiral springs placed the one at the side of the other.

The novelty consists essentially in that the springs forming the insert are each provided or formed at the upper and lower ends with integral rings, the rings being located at the side of the spring and serving as means for connecting adjacent springs with each other. The connecting rings of the springs are preferably formed by bending at least one of the upper and lower windings, the ends of the rings being preferably hooked into or connected to the windings of the springs at points located inwardly of the upper and lower surfaces of the insert.

A resilient cushion or insert formed in this manner is smooth on its upper and lower surfaces owing to the fact that no knots, hooks or other connections between the springs are exposed. The insert, moreover, may be made by hand in a simple manner without any special machines or tools. The insert is light in weight and can be economically manufactured being, as a matter of fact, lighter than the usual insert due to the employment of a smaller number of complete springs, every other spring only being of full length.

Three embodiments of the invention are illustrated by way of example in the accompanying drawing in which.

Figure 1:
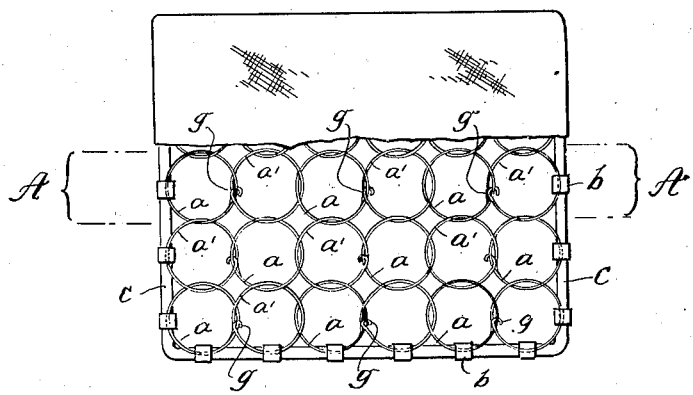
Fig. 1 shows the insert in top plan view, the cover being partly cut off.

The resilient insert consists of a plurality of spiral springs $a$ all of the same height arranged vertically side by side, the windings of the spiral springs on the outer circumference of the insert, which is for instance of rectangular shape, being attached by means of sheet metal clamps $b$ or the like to an upper or lower holding frame $c$ or $d$. The insert or spring cushion is covered in known manner by a cover $f$, on which the bolster is placed which is not shown in the drawing.

Figure 2:
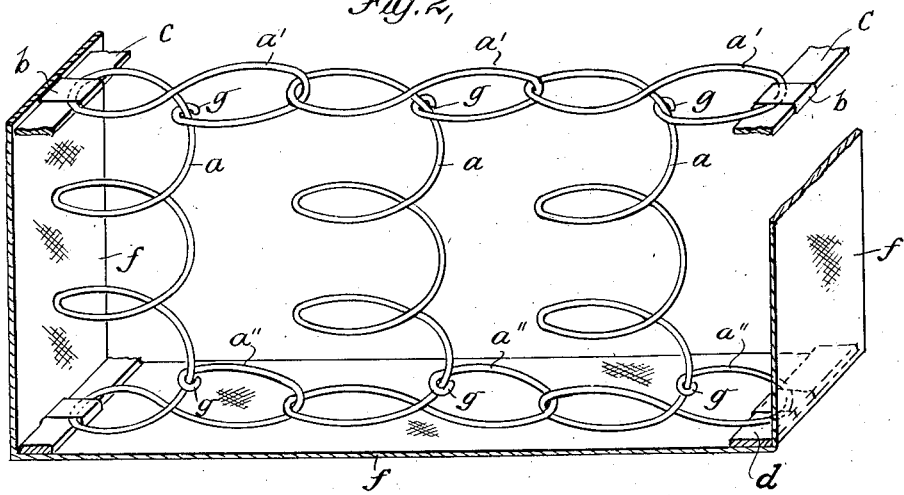
Fig. 2 shows in perspective view one single row of springs A—A of the Fig. 1.

As shown in Fig. 2 each spring $a$ is extended at its upper and lower ends and is bent to form lateral rings $a'$ or $a''$, the ends $g$ of the rings being provided with eyes or hooks which are fixed to the original spring $a$. The ends $g$ are connected to the springs underneath the upper and above the lower surfaces formed by the extreme windings of the original spring $a$, so that any contact between the ends $g$ and the cover $f$ resting on the extreme windings of the spring $a$ is avoided in a simple manner. The rings $a'$ and $a''$ are preferably formed, from the original spring $a$ at the top and at the bottom by a reverse bend of 180°. The rings $a'$ and $a''$ serve for holding and staying of the adjacent complete springs $a$ the wire windings of which engage with the rings $a'$ and $a''$. As shown in Fig. 1 the springs $a$ are arranged in staggered relation to each other.

In this manner an insert, consisting of a plurality of separate spiral springs $a$, is produced which, on the one hand, is perfectly smooth on the upper and lower surfaces which come into contact with the cover $f$ and free from knot formations or free ends which easily might damage the cover $f$. The new insert is further distinguished in that it is of simple construction and can be made by hand. Owing to the use of a small number of complete springs, it presents further the advantage of light weight and cheapness and of possessing a specially soft yieldability.

Figure 3:
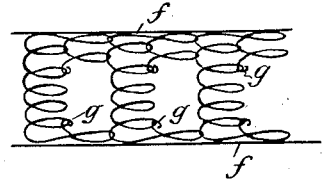
Figs. 3 and 4 illustrate two modified forms of construction on a smaller scale.
Figure 4:
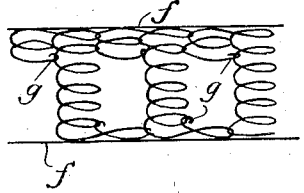

The invention is evidently not limited to the forms of construction shown, for as illustrated in Figures 3 and 4, various modifications are possible. The two bent off rings $a'$ and $a''$ may be arranged for instance so that, instead of extending both in the same direction, they extend in opposite directions, i. e. are lying on two opposite sides of the original spring.

It is further possible, especially on springs which have more than the four windings shown in the drawing, to use a double winding ring $a'$ for the mutual supporting instead of the simple ring. For instance, as shown in Figs. 3 and 4, instead of one single ring on each end of the spring, two windings of the original spring can be bent off in the manner above described. In this case the knot or hook-shaped end fixation is lying farther in the interior of the insert.

I claim:

1. An insert for mattresses or the like, composed of a number of vertically disposed spiral springs, arranged in longitudinal and transverse rows, each spring having at its upper and lower end a ring integral with the spring, situated on the outer side of the spring axis, and serving as binding means for a plurality of adjacent springs, and to form with the springs substantially unbroken top and bottom surfaces.

2. An insert for mattresses or the like, composed of a number of vertically disposed spiral springs, arranged in longitudinal and transverse rows, each spring having at its upper and lower end a connecting ring integral with the spring and disposed to one side of the spring axis, said connecting rings being formed by at least one of the originally uppermost or lowermost spring windings bent away approximately 180 degrees from the respective springs, and said rings being effective to bind a plurality of adjacent springs together and to form with the springs substantially unbroken top and bottom supporting surfaces for the insert, the ends of the rings being connected by hooking or tying with the windings of the original respective spring between the upper and lower surfaces of the insert.

3. An insert for mattresses or the like comprising a plurality of spiral springs arranged side by side, each spring being spaced from the adjacent springs by approximately the width of a spring and being connected by rings formed as a continuation of one of the adjacent springs, and extending over the space between adjacent springs.

4. An insert for mattresses or the like comprising a plurality of spiral springs arranged side by side, each spring having an end convolution disposed to one side of the spring axis and connected to an adjacent spring at a point disposed inwardly of the outer surfaces of said end convolutions, to form a substantially continuous supporting surface for the insert.

5. An insert for mattresses or the like, comprising a plurality of spiral springs arranged side by side, each spring having an end convolution of a diameter substantially that of the spring, disposed to one side of the spring axis and connected to an adjacent spring at a point disposed inwardly of the outer surfaces of said end convolutions and effective thereby to space the adjacent springs and to form with said springs a substantially continuous supporting surface for the insert, said end convolution being further connected to an adjacent convolution of its spring at a point disposed inwardly from the ends of the spring.

In testimony whereof I affix my signature.

ALFRED EHLENBECK.